US010941327B2

(12) United States Patent
Arfaj et al.

(10) Patent No.: US 10,941,327 B2
(45) Date of Patent: *Mar. 9, 2021

(54) METHOD AND MATERIAL FOR ISOLATING A SEVERE LOSS ZONE

(71) Applicant: Saudi Arabian Oil Company, Dhahran (SA)

(72) Inventors: Mohammed K. Arfaj, Dammam (SA); Md Amanullah, Dhahran (SA); Raed A. Alouhali, Dhahran (SA); Turki Alsubaie, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,817

(22) Filed: Feb. 13, 2019

(65) Prior Publication Data

US 2019/0249062 A1    Aug. 15, 2019

Related U.S. Application Data

(60) Provisional application No. 62/631,073, filed on Feb. 15, 2018, provisional application No. 62/631,126, filed on Feb. 15, 2018, provisional application No. 62/631,122, filed on Feb. 15, 2018, provisional application No. 62/631,062, filed on Feb. 15, 2018.

(51) Int. Cl.
| | | |
|---|---|---|
| *C09K 8/035* | (2006.01) | |
| *C09K 8/516* | (2006.01) | |
| *E21B 33/138* | (2006.01) | |
| *C09K 8/508* | (2006.01) | |
| *E21B 21/00* | (2006.01) | |

(52) U.S. Cl.
CPC .............. *C09K 8/035* (2013.01); *C09K 8/508* (2013.01); *C09K 8/516* (2013.01); *E21B 21/003* (2013.01); *E21B 33/138* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 2,935,472 A | 5/1960 | Klaas et al. | |
| 3,202,214 A | 8/1965 | McLaughlin, Jr. et al. | |
| 3,850,249 A | 11/1974 | Hess | |

(Continued)

FOREIGN PATENT DOCUMENTS

| | | |
|---|---|---|
| WO | 0153429 A1 | 7/2001 |
| WO | 2004109053 A2 | 12/2004 |

OTHER PUBLICATIONS

International Search Report and Written Opinion dated May 14, 2019 pertaining to International application No. PCT/US2019/017816 filed Feb. 13, 2019, 14 pgs.

(Continued)

*Primary Examiner* — Anuradha Ahuja
(74) *Attorney, Agent, or Firm* — Dinsmore & Shohl LLP

(57) ABSTRACT

A method and drilling fluid additive for reducing severe fluid losses in a well, comprising a combination of granular scrap tire particles and polymer adhesive molded into a spherical shape. Once in the severe loss zone, a plurality of LCMs wedge into the formation fractures and seal off the severe loss zone.

13 Claims, 9 Drawing Sheets

(56) References Cited

U.S. PATENT DOCUMENTS

| | | | |
|---|---|---|---|
| 4,564,070 | A | 1/1986 | Norton |
| 4,732,213 | A | 3/1988 | Bennett et al. |
| 4,799,549 | A | 1/1989 | Vinot et al. |
| 4,901,797 | A | 2/1990 | Summers et al. |
| 5,203,834 | A | 4/1993 | Hutchins et al. |
| 5,320,171 | A | 6/1994 | Laramay |
| 5,712,314 | A | 1/1998 | Surles et al. |
| 6,472,461 | B1 * | 10/2002 | Nakamura ............ B60C 1/0016 152/209.5 |
| 6,518,224 | B2 | 2/2003 | Wood |
| 6,582,819 | B2 * | 6/2003 | McDaniel ................ A63K 1/00 166/295 |
| 6,615,918 | B2 | 9/2003 | Bayliss et al. |
| 6,821,623 | B2 | 11/2004 | Kvesic |
| 7,013,973 | B2 | 3/2006 | Danican et al. |
| 7,163,358 | B2 | 1/2007 | Greenwood et al. |
| 7,455,112 | B2 | 11/2008 | Moorehead et al. |
| 7,458,424 | B2 | 12/2008 | Odeh et al. |
| 7,482,309 | B2 | 1/2009 | Ravi et al. |
| 7,926,567 | B2 | 4/2011 | Harris et al. |
| 7,934,557 | B2 | 5/2011 | Nguyen |
| 7,954,549 | B2 | 6/2011 | Lende et al. |
| 8,030,251 | B2 | 10/2011 | Todd et al. |
| 8,607,895 | B2 | 12/2013 | Hoskins |
| 8,776,882 | B2 | 7/2014 | Shindgikar et al. |
| 8,822,388 | B2 | 9/2014 | Burns et al. |
| 9,040,468 | B2 | 5/2015 | Loiseau et al. |
| 9,045,965 | B2 | 6/2015 | Patil et al. |
| 9,133,386 | B2 | 9/2015 | Kumar et al. |
| 9,284,798 | B2 | 3/2016 | Jamison et al. |
| 9,518,210 | B2 | 12/2016 | Ezell et al. |
| 9,546,534 | B2 | 1/2017 | Lecerf et al. |
| 9,688,901 | B2 | 6/2017 | Fontenot |
| 9,765,252 | B2 | 9/2017 | Roddy et al. |
| 10,053,613 | B1 | 8/2018 | Kalgaonkar et al. |
| 2002/0022694 | A1 * | 2/2002 | Wallenwein ............ C08L 21/00 525/134 |
| 2004/0129460 | A1 | 7/2004 | MacQuoid et al. |
| 2004/0244978 | A1 | 12/2004 | Shaarpour |
| 2005/0252659 | A1 | 11/2005 | Sullivan et al. |
| 2006/0019834 | A1 | 1/2006 | Melbouci et al. |
| 2008/0035343 | A1 | 2/2008 | Odeh et al. |
| 2008/0275176 | A1 | 11/2008 | Limin et al. |
| 2009/0042750 | A1 | 2/2009 | Pauls et al. |
| 2009/0221452 | A1 | 9/2009 | Whitfill et al. |
| 2009/0314493 | A1 | 12/2009 | Harris et al. |
| 2010/0016183 | A1 | 1/2010 | Roddy et al. |
| 2010/0293814 | A1 * | 11/2010 | Skaja ........................ A43B 1/12 36/25 R |
| 2010/0298175 | A1 | 11/2010 | Ghassemzadeh |
| 2011/0094746 | A1 | 4/2011 | Allison et al. |
| 2012/0061083 | A1 | 3/2012 | Ballard |
| 2013/0284518 | A1 | 10/2013 | Wu et al. |
| 2013/0292120 | A1 | 11/2013 | Patil et al. |
| 2014/0061123 | A1 | 3/2014 | Summer et al. |
| 2014/0069644 | A1 | 3/2014 | Reddy et al. |
| 2014/0158354 | A1 | 6/2014 | Kumar et al. |
| 2014/0158359 | A1 | 6/2014 | Davidson et al. |
| 2014/0162910 | A1 | 6/2014 | Braley et al. |
| 2014/0262281 | A1 * | 9/2014 | Kulkarni ................ C09K 8/02 166/305.1 |
| 2015/0008044 | A1 | 1/2015 | Fontenot |
| 2015/0021027 | A1 | 1/2015 | Chapman |
| 2015/0267500 | A1 | 9/2015 | Van Dongen et al. |
| 2015/0344772 | A1 | 12/2015 | Droger et al. |
| 2016/0017204 | A1 | 1/2016 | Hill et al. |
| 2016/0122625 | A1 | 5/2016 | Singh et al. |
| 2017/0166795 | A1 | 6/2017 | Walker et al. |
| 2017/0218248 | A1 | 8/2017 | Boul et al. |
| 2017/0247602 | A1 | 8/2017 | Belakshe et al. |
| 2017/0362499 | A1 | 12/2017 | Welton |
| 2019/0055456 | A1 | 2/2019 | Wagle et al. |

OTHER PUBLICATIONS

Musaed N. J. Alawad et al., Utilization of shredded waste car tyres as a fracture seal material (FSM) in oil and gas drilling operations, Journal of Petroleum and Gas Engineering, vol. 8, No. 3, May 30, 2017, pp. 21-28.

International Search Report and Written Opinion dated Apr. 17, 2019 pertaining to International application No. PCT/US2019/017797 filed Feb. 13, 2019,14 pgs.

International Search Report and Written Opinion dated Apr. 17, 2019 pertaining to International application No. PCT/US2019/017813 filed Feb. 13, 2019,14 pgs.

International Search Report and Written Opinion dated Apr. 17, 2019 pertaining to International application No. PCT/US2019/017796 filed Feb. 13, 2019,14 pgs.

Office Action dated Aug. 19, 2019 pertaining to U.S. Appl. No. 16/274,831, filed Feb. 13, 2019, 28 pgs.

Office Action dated Aug. 19, 2019 pertaining to U.S. Appl. No. 16/274,804, filed Feb. 13, 2019, 29 pgs.

Office Action dated Aug. 19, 2019 pertaining to U.S. Appl. No. 16/274,837, filed Feb. 13, 2019, 29 pgs.

Office Action dated Dec. 9, 2019 pertaining to U.S. Appl. No. 16/274,831, filed Feb. 13, 2019, 20 pgs.

Office Action dated Dec. 9, 2019 pertaining to U.S. Appl. No. 16/274,804, filed Feb. 13, 2019, 21 pgs.

Office Action dated Dec. 9, 2019 pertaining to U.S. Appl. No. 16/274,837, filed Feb. 13, 2019, 21 pgs.

GCC Examination Report dated Jun. 24, 2020 for Application No. GC 2019-37584.

International Search Report and Written Opinion dated Jul. 5, 2019 pertaining to International application No. PCT/US2019/032009 filed May 13, 2019.

Hatzignatiou et al., Water-Soluble Silicate Gelants: Comparison and Screening for Conformance Control in Carbonate Natrually Fractured Reservoirs, Journal of Non-Crystalline Solids 479, pp. 72-81, 2018.

Huang et al., "Systematic Approach to Develop a Colloidal Silica Based Gel System for Water Shut-off", SPE-183942-MS, 2017.

Patil et al., "Environmentally Acceptable Compositions Nanomaterials for Plugging and Sealing Subterranean Formulations", SPE-154917, 2012.

Notice of Allowance and Fee(s) Due dated Apr. 22, 2020 pertaining to U.S. Appl. No. 15/981,998, filed May 17, 2018, 7 pgs.

Office Action dated Feb. 6, 2020 pertaining to U.S. Appl. No. 15/981,998, filed May 17, 2018, 11 pgs.

International Search Report and Written Opinion dated Jul. 23, 2019 pertaining to International application No. PCT/US2019/032012 filed May 13, 2019, 13 pgs.

Office Action dated Oct. 7, 2020 pertaining to U.S. Appl. No. 16/667,263, filed Oct. 29, 2019, 32 pgs.

Notice of Allowance dated Nov. 3, 2020 pertaining to U.S. Appl. No. 16/274,804, filed Feb. 13, 2019, 22 pgs.

Examination Report pertaining to Application No. GC2019-37050 dated Nov. 22, 2020.

* cited by examiner

METHOD AND MATERIAL FOR ISOLATING A SEVERE LOSS ZONE

CROSS REFERENCE TO RELATED APPLICATIONS

This application claims the benefit of U.S. Provisional Application Ser. No. 62/631,122 filed Feb. 15, 2018, U.S. Provisional Application Ser. No. 62/631,062 filed Feb. 15, 2018, U.S. Provisional Application Ser. No. 62/631,073 filed Feb. 15, 2018, and U.S. Provisional Application Ser. No. 62/631,126 filed Feb. 15, 2018.

TECHNICAL FIELD

The present disclosure relates generally to the use of a loss control material (or lost circulation material, in either event, LCM) as a way to seal fractures that form in a drilled wellbore. More specifically, it relates to the use of a plurality of engineered LCMs with at least one of a conical shape, a capsule shape, a spherical shape, an ovoid shape, or combinations of these, and elastically deformable construction. This engineered LCM forms a seal within severe loss zone fractures, thereby reducing or eliminating the amount of drilling fluid lost during a wellbore drilling operation.

BACKGROUND

Drilling fluid loss—commonly referred to as lost circulation—is a significant problem in the oil and gas industry. Lost circulation arises from wellbore drilling that penetrates into geological formations that are fractured, cavernous, vugular, underpressured, or highly permeable, such as those with a permeability greater than 100 Darcys. Lost circulation is typically classified into four volumetric loss rate categories or zones, depending on the amount of fluid lost per unit of time: seepage losses are those associated with the loss of less than about 10 barrels per hour; partial losses are those associated with the loss of between about 10 barrels per hour and about 100 barrels per hour; severe losses are those associated with the loss of over about 100 barrels per hour; while total losses are those where no fluid returns to the surface of the wellbore and that typically necessitates abandoning the well. Typically, the sizes of these geological voids can be correlated to whether the potential for drilling fluid loss fits into one of these four categories.

Lost circulation can be prevented in some circumstances through the use of pre-drilling geomechanical models and related analytical tools, as well as through the use of reinforced wellbore wall and related strengthening. In circumstances where such preventive measures do not provide ample protection against lost circulation, LCMs may be introduced as an LCM pill or via the drilling fluid as a remediation approach. While exhibiting some benefit, these LCMs have traditionally been ineffective for severe loss zones such as those that arise from fractures with openings that exhibit conical, ovular, elliptical, circular, semi-circular, pseudo-cylindrical, triangular, curvi-planar or other shapes, as well as the various sizes of these fractures.

SUMMARY

Lost circulation encountered while drilling is a major problem in the oil and gas industry that is difficult to combat in severe loss zones. The LCMs typically introduced into the wellbore to combat severe losses are cheap, easy to access materials. These small LCMs may be easily dislodged from the wellbore fractures and allow further fluid loss instead of packing the fractures and effectively preventing fluid loss. However, these materials are typically individual rubber particles that are not adhered to each other, or, if there is an adhesive, the rubber particles adhered to each other do not form a shape capable of being compressed and wedged into fractures. These conventional materials are not engineered for the specific purpose of remediating severe losses, and therefore are not effective at blocking the severe zone. Accordingly, an improved approach to reducing or eliminating the loss of drilling fluid for such severe loss zones is warranted. The LCMs as described in this disclosure include rubber particles and a polymer adhesive that binds the rubber particles together to form a shape, such as a cone, capsule, sphere, or ovoid. These LCMs are resilient and are capable of being compressed and wedged into fractures, blocking the severe loss zone and remediating severe losses.

According to one embodiment, a method of reducing lost circulation in a severe loss zone of a wellbore is disclosed. The method includes preparing a drilling fluid by combining a liquid carrier with a weighting material and an additive and introducing the drilling fluid into the severe loss zone such that numerous cone-shaped LCMs become lodged in at least one fracture that defines the severe loss zone. The additive includes numerous cone-shaped LCMs. This material is composed of numerous granular scrap tire particles and a polymer adhesive that is dispersed between the granular scrap tire particles and binds the granular scrap tire particles together introducing a drilling fluid comprising a liquid carrier, a weighting material and a plurality of additives into the severe loss zone such that the plurality of additives become lodged in at least one fracture that defines the severe loss zone, the plurality of additives comprising: cone-shaped LCMs, capsule-shaped LCMs, spherical-shaped LCMs, ovoid-shaped LCMs, or a combination of these, and the LCMs comprise: a plurality of granular scrap tire particles; and a polymer adhesive that is dispersed between the plurality of granular scrap tire particles and binds the plurality of granular scrap tire particles together.

According to a second embodiment, an LCM additive for a drilling fluid is disclosed. The additive includes cone-shaped LCMs, capsule-shaped LCMs, spherical-shaped LCMs, ovoid-shaped LCMs, or a combination of these. The LCMs include a plurality of granular scrap tire particles and a polymer adhesive that is dispersed between the granular scrap tire particles and binds the granular scrap tire particles together.

According to yet another embodiment, a drilling fluid is disclosed. The drilling fluid includes a slurry including a liquid carrier, a weighting agent, and an LCM additive. The LCM additive includes cone-shaped LCMs, capsule-shaped LCMs, spherical-shaped LCMs, ovoid-shaped LCMs, or a combination of these. The LCM includes a plurality of granular scrap tire particles and a polymer adhesive that is dispersed between the granular scrap tire particles and binds the granular scrap tire particles together.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
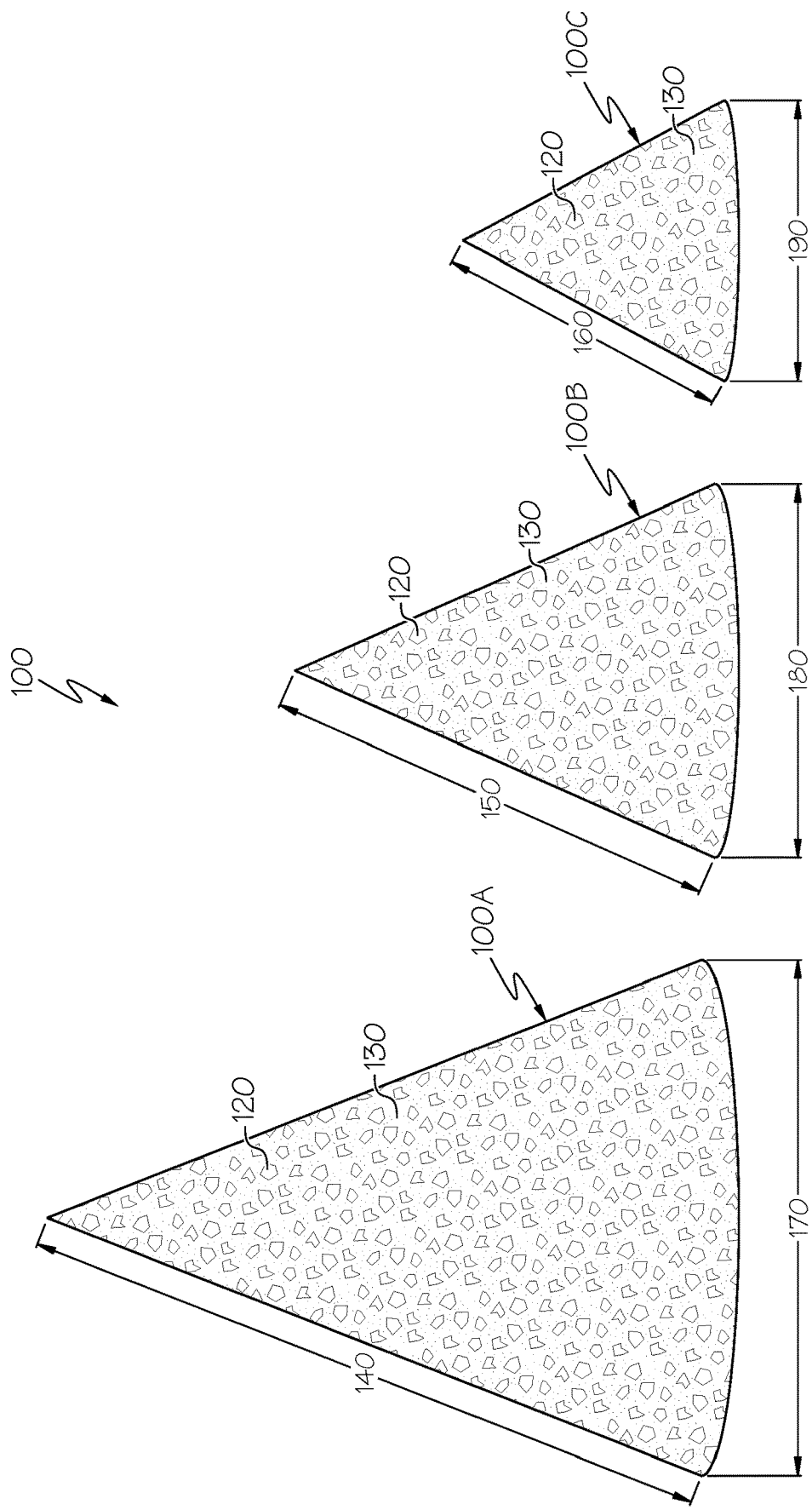
FIG. 1 depicts three cone-shaped LCMs of varying dimensions, in which the cone-shaped LCMs comprise granular scrap tire particles mixed with a polymer adhesive.

The LCMs of this disclosure are directed to holistically address the various shapes of fractures in loss zones. Loss zones may include cone-shaped fractures, capsule-shaped fractures, sphere-shaped fractures, ovoid-shaped fractures, or combinations of these. Loss zones dominated by cone-shaped fracture openings of various base diameters and cone lengths can be effectively sealed and blocked by a resilient elastic rubber sealant material shaped into cones of variable dimensions. The apex of the cone-shaped LCM will guide the cone into the fractures to create a wedging effect in the opening of the fracture due to the squeezing pressure applied during the placement of the LCMs and thus can provide an effective solution to lost circulation while drilling. As used throughout this disclosure, the term "apex" refers to the top of the LCM cone. The diameter of the apex may range from 500 microns to half the diameter of the base. Due to the wedging effect, these cone-shaped LCMs are an appropriate material to control lost circulation zones dominated by fractures with conical configurations. The LCM need not have a separate outer coating or material. As used throughout this disclosure, the term "lost circulation zone" refers to a formation encountered during drilling into which circulating fluids can be lost due to fractures in the formation. As used throughout this disclosure, the term "formation" refers to a subterranean geologic region containing hydrocarbons, such as crude oil, hydrocarbon gases, or both, which may be extracted from the subterranean geologic region.

Loss zones dominated by capsule-shaped fractures (also referred to as fracture openings) of various sizes can be effectively sealed and blocked by comparably-shaped resilient elastic rubber sealant capsule-shaped LCMs of varying dimensions. In one form, the capsule-shaped LCMs are configured for use in a wellbore loss zone that contains a cylindrical morphology along at least a portion of a length of one or more fractures. In one particular form, these wellbore loss zones dominated by such fracture (or fracture openings) correspond to severe loss zones such that the introduction of these capsule-shaped LCMs can reduce or eliminate lost circulation owing at least in part to the size and generally non-axisymmetric shape of such capsule-shaped LCMs. As used throughout this disclosure, severe loss zones may be found in fractured, cavernous, vugular, underpressured or highly permeable geological formations, such as those with a permeability greater than 100 Darcys. Severe loss zones generally do not include impermeable or zones with a permeability of less than 10 Darcys, overpressured zones or deep sand.

The reduction or elimination of lost circulation takes place through the formation of set seals or plugs that result from the capsule-shaped LCMs becoming lodged into the fractures such that the capsule-shaped LCMs experience in-situ stresses from the subterranean walls that define the fractures. As such, the resilient nature of the rubber particles, for example, scrap tire particles, forms an LCM that is malleable, ductile, deforms without failure, and shrinks under pressure to enter fractures. Furthermore, because these capsule-shaped LCMs can be fabricated by using elastically resilient particles that can be reclaimed from scrap rubber (such as discarded automobile tires, which are numerous), environmental benefits may be enjoyed through the reduction in the amount of landfill associated with the discarded tires.

In one form, hemispherical end caps of the capsule-shaped LCM will allow easy entry of the capsule-shaped LCMs into the fractured flow channels under the action of initial flow of fluid into the fractured loss zone, while the larger cylindrical portion will inhibit excessive movement of the capsule-shaped LCMs into the fractures, particularly when the capsule-shaped LCMs encounter narrow footholds, ridges, bulges or narrow bends formed in the flow channels that are defined by the fractures. This in turn leads to choking and associated clogging which in turn mitigates the passage of drilling fluid through these fracture channels.

Loss zones dominated by spherical-shaped LCMs of various sizes can be effectively sealed and blocked by comparably-shaped resilient elastic rubber sealant spherical-shaped LCMs of varying dimensions. In one form, the spherical-shaped LCMs are configured for use in a wellbore loss zone that contains spherical morphology along at least a portion of a length of one or more fractures.

Loss zones dominated by ovoid-shaped fracture openings of various major axis lengths can be effectively sealed and blocked by a resilient elastic rubber sealant material shaped into ovoids of variable dimensions. As used throughout this disclosure, the term "ovoid" refers to an egg-shaped object with a narrow tip and a broad base. The narrow tip of the ovoid-shaped LCM will guide the ovoid into the fractures to create a wedging effect in the opening of the fracture due to the squeezing pressure applied during the placement of the LCMs and thus can provide an effective solution to lost circulation while drilling. As used throughout this disclosure, the term "narrow tip" refers to the narrower end of the LCM ovoid. The diameter of the narrow tip may range from 500 microns to half the length of the minor axis length. Due to the wedging effect, these ovoid-shaped LCMs are an appropriate material to control lost circulation zones dominated by fractures with ovoid configurations. The LCM need not have a separate outer coating or material.

As referenced previously, lost circulation is typically classified into four volumetric loss rate categories. Typically, the size of these geological voids can be correlated to whether the potential for drilling fluid loss fits into one of these four zones. As used throughout this disclosure, the term "drilling fluid" refers to any of a number of liquid and gaseous fluids and mixtures of fluids and solids (as solid suspensions, mixtures and emulsions of liquids, gases and solids) used in operations to drill boreholes into the earth. These geological voids, or fractures, may be measured by running logs down the annulus to determine the opening size of the fractures. As used throughout this disclosure, the term "annulus" refers to the space between two concentric objects, such as between the wellbore and casing or between casing and tubing, where fluid can flow. Likewise, the term "pipe" may refer to drill collars, drill pipe, casing or tubing.

Referring first to FIG. 1, an LCM additive for a wellbore drilling fluid is shown. In one form, the cone-shaped LCMs 100 comprise a plurality of granular scrap tire particles 120 and a polymer adhesive 130 that is dispersed between the plurality of granular scrap tire particles 120 and binds the plurality of granular scrap tire particles 120 together. As used throughout this disclosure, the term "granular scrap tire particles" refers to rubber particles manufactured from removing at least one of dust, steel fibers, and textile fibers prior to breaking down a tire into individual rubber particles with a particle size ranging from 500 microns to 10,000 microns each. The resulting cone-shaped LCMs 100 form a resilient elastic rubber sealant material that is malleable, ductile, deforms without failure, and shrinks under pressure to enter fractures. The granular scrap tire particles 120 mix with the polymer adhesive 130 such that the polymer adhesive 130 is dispersed between the granular scrap tire particles 120, binding the granular scrap tire particles 120 together and holding the granular scrap tire particles 120 in place throughout the cone-shaped LCMs 100. In one embodiment, the plurality of granular scrap tire particles 120 comprises at least one of styrene-butadiene rubber (SBR) and ethylene propylene diene monomer (EPDM) rubber.

More specifically, this polymer adhesive 130 may comprise, but is not limited to, a polyurethane-based material. As used throughout this disclosure, the term "polyurethane" refers to a synthetic resin polymer adhesive composed of organic units joined by urethane links. Alternatively, the polymer adhesive 130 may comprise, but is not limited to, a reaction product of an aromatic polyisocyanate-prepolymer based on diphenylmethane diisocyanate.

In another embodiment, the LCM additive comprises up to 30% polymer adhesive 130 by volume (vol. %), from 10 to 40 vol. % polymer adhesive 130, or from 20 to 30 vol. % polymer adhesive 130.

The polymer adhesive 130 may not be substituted with a substance such as wax, because wax would lose cohesion with the granular scrap tire particles 120 in the high pressure and temperature conditions of the lost circulation zone. Wax begins to melt into a liquid at about 99° F. and would not bind the granular scrap tire particles 120 together at a temperature greater than 99° F.

FIG. 1 shows three different sizes of the cone-shaped LCMs 100, where one cone-shaped LCM 100A comprises a base diameter 170 of 7.5 centimeters (cm), a slant length 140 of 10 cm, and a surface area of at least 117 cm². In a second embodiment, the cone-shaped LCM 100B comprises a base diameter 180 of 5 cm, a slant length 150 of 7.5 cm, and a surface area of at least 58 cm². In a third embodiment, the cone-shaped LCM 100C comprises a base diameter 190 of 2.5 cm, a slant length 160 of 5 cm, and a surface area of at least 19 cm². In another embodiment, the cone-shaped LCMs 100 may comprise a base diameter ranging from 2.5 to 7.5 centimeters, a slant length ranging from 5 to 10 centimeters, and a conical surface area of at least 19 square centimeters. The cone-shaped LCMs may be formed in a variety of sizes in further embodiments, not limited to the sizes described in this disclosure.

Figure 2:
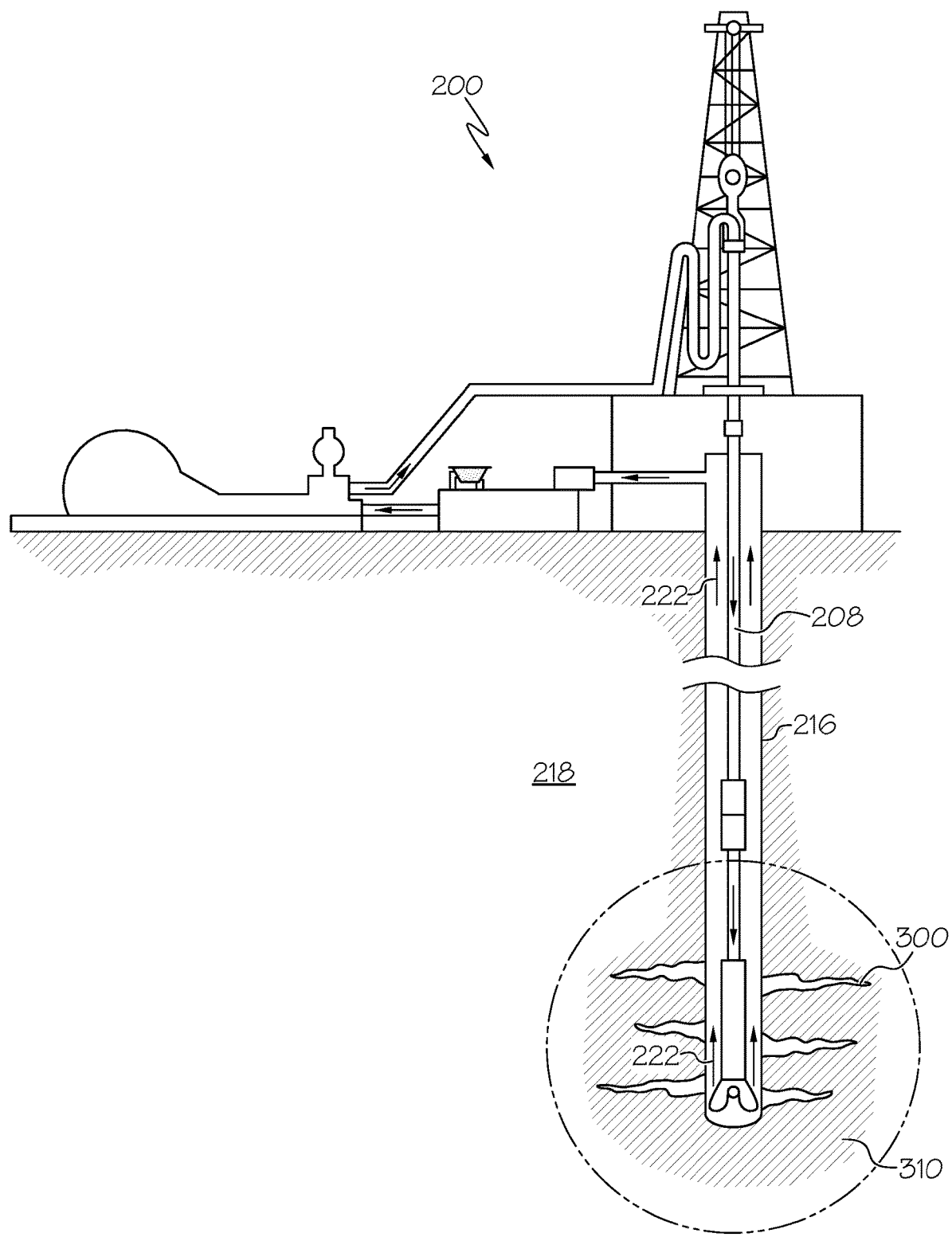
FIG. 2 illustrates a drilling assembly as referenced in this application for delivering the cone-shaped LCMs to the severe loss zones.

Referring next to FIG. 2, a drilling assembly 200 used for reducing lost circulation in a severe loss zone 310 of a wellbore is shown. As used throughout this disclosure, the term "severe loss zone" refers to a lost circulation zone in which the amount of fluids lost per hour falls into the severe losses category. Severe loss zones may be found in fractured, cavernous, vugular, underpressured, or highly permeable formations, such as those with a permeability greater than 100 Darcys. As used throughout this disclosure, the term "underpressured" refers to a formation with a pore pressure that is less than hydrostatic pressure. However, severe loss zones 310 do not include impermeable or low permeability zones, overpressured zones, or deep sand. It will be appreciated that although the drilling assembly 200 is illustrated for the recovery or extraction of such hydrocarbons, the disclosed materials, equipment and associated techniques may be useful in circulating fluids in a wellbore for other purposes, such as for drilling or related operations, as well as those wellbore 216 operations where variable-density drilling fluid 222 may be used, such as for deeper wellbores 216 that can help maintain adequate levels of hydrostatic pressure as a way to avoid an influx of formation fluid (gas or liquid).

The method may comprise introducing a drilling fluid 222 and a plurality of LCM additives 100 into the severe loss zone 310 such that the plurality of cone-shaped LCMs 100 becomes lodged in at least one fracture 300 that defines the severe loss zone 310. Although the plurality of LCM additives is depicted as a plurality of cone-shaped LCMs, it is to be understood that the plurality of LCM additives may be any of cone-shaped LCMs, capsule-shaped LCMs, spherical-shaped LCMs, ovoid-shaped LCMs, or a combination of these. The drilling fluid 222 is formed by combining a liquid carrier with a weighting material. As used throughout this disclosure, the term "weighting material" can refer to barite, calcium carbonate, hematite, siderite, ilmenite, or combinations of these. These weighting materials will increase the density or viscosity of the drilling fluid 222, thereby making the drilling fluid 222 more capable of carrying large solids, such as the LCM additives 100, downhole.

Figure 3:
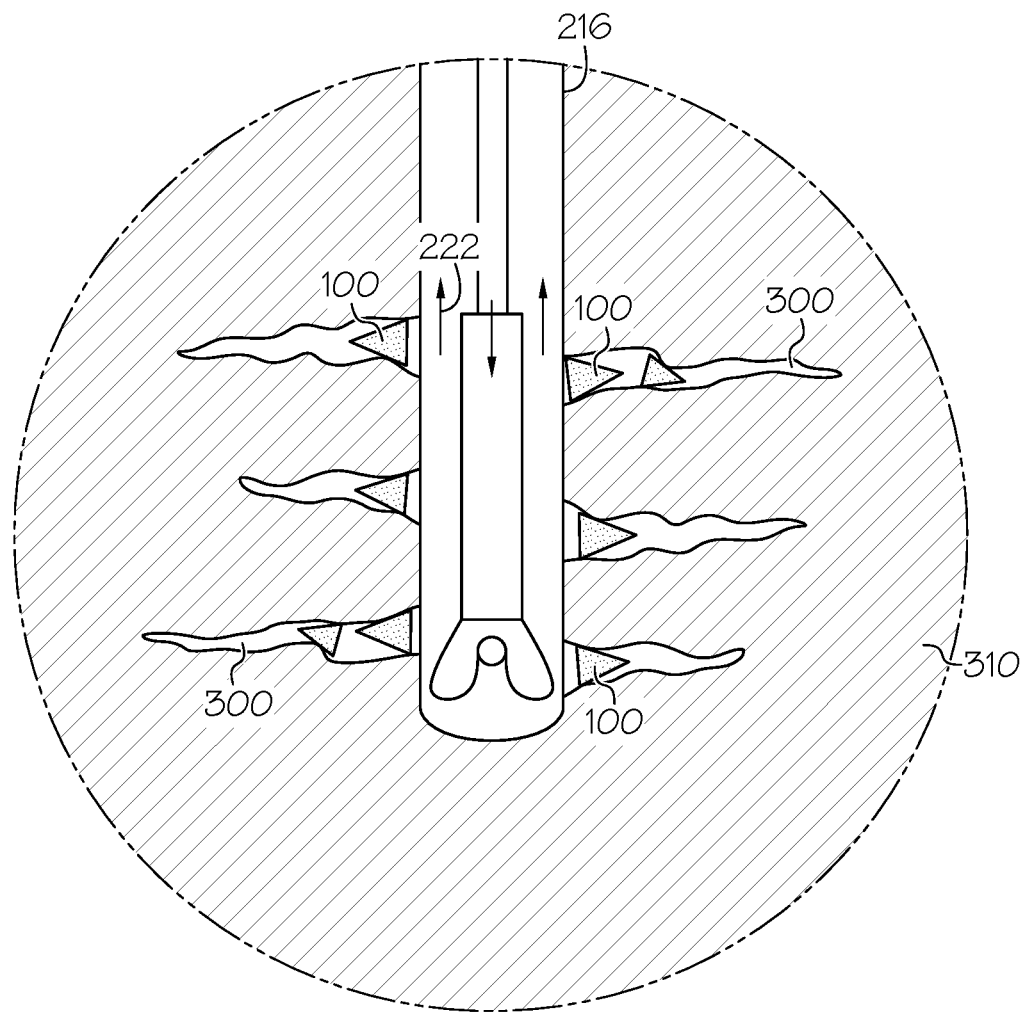
FIG. 3 illustrates a wellbore drilled in a fractured formation and the cone-shaped LCMs that penetrated the fractures and sealed the zone.

Referring next to FIG. 3, the drilling fluid 222 may be introduced into the severe loss zone 310 such that the cone-shaped LCMs 100 become lodged in the fractures 300 that define the severe loss zone 310; such lodging forms flow blockage that helps to isolate the severe loss zone 310 of the wellbore 226. More specifically, the cone-shaped LCMs 100 may be used for a severe loss zone 310 comprised of cone-shaped fracture openings 300. To isolate the severe loss zone 310, the cone-shaped LCM is introduced into the severe loss zone 310 as squeezing pressure is applied down the wellbore 216. This squeezing pressure causes the apex of the cone-shaped LCM to slide into the cone-shaped fracture openings 300, wedging the cone-shaped LCM into the cone-shaped fracture openings 300 and sealing the severe loss zone 310.

In one embodiment, the plurality of cone-shaped LCMs 100 have a base diameter ranging from 2.5 to 7.5 centimeters, a slant length ranging from 5 to 10 centimeters, and a conical surface area of at least 19 square centimeters, and can create a tight seal in cone-shaped fracture openings 300 with an opening base diameter or gap size smaller than, equal to, or greater than 2.5 centimeters. In another embodiment, the method further comprises drilling through a plurality of cone-shaped LCMs 100 sealing the severe loss zone 310 to continue drilling the wellbore 216. In another embodiment, the method further comprises introducing the plurality of cone-shaped LCMs 100 to the severe loss zone 310 through a drill string disposed within the wellbore 216. In another embodiment, the method further comprises introducing a displacement fluid to displace the plurality of cone-shaped LCMs 100 into severe loss zone 310.

Figure 4:
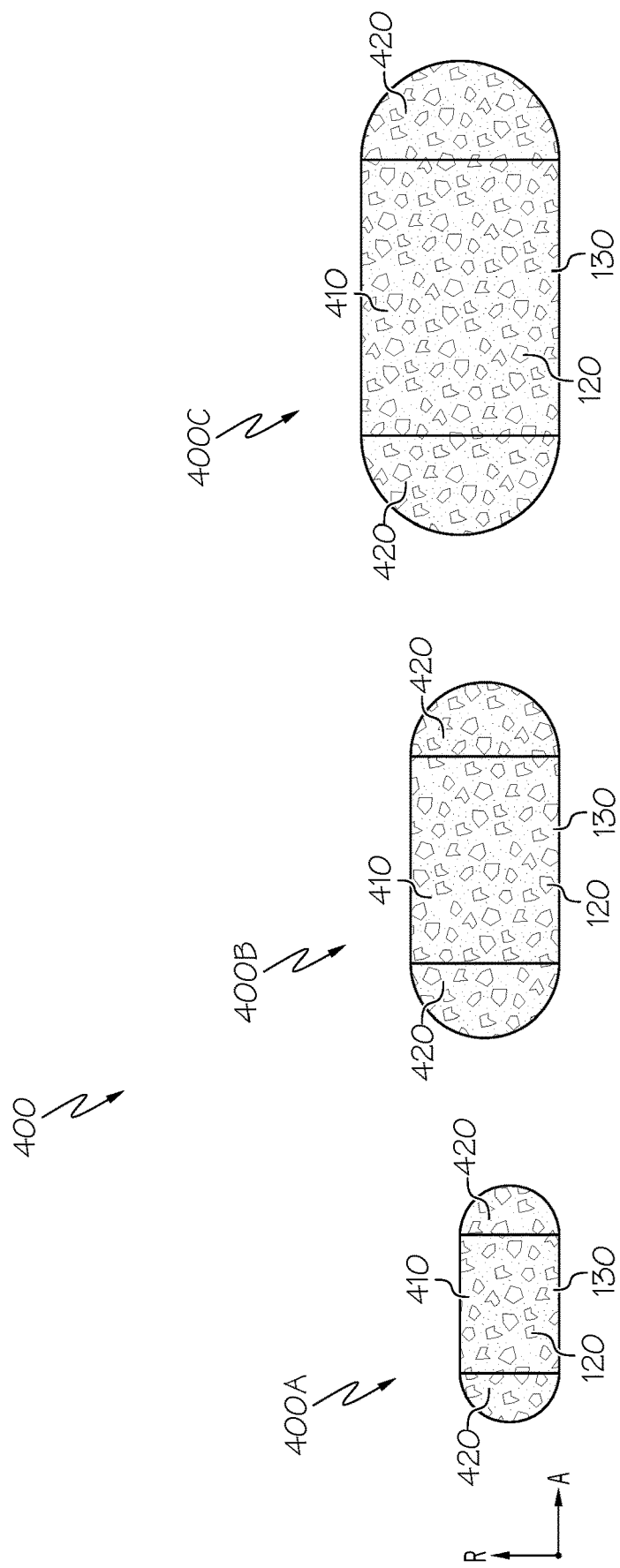
FIG. 4 depicts three different sizes of capsule-shaped LCMs in accordance with one or more embodiments shown or described.

Referring to FIG. 4, details associated with various sizes of capsule-shaped LCMs that are generally identified as 400 are shown, where more particularly the sizes may correspond to small capsule-shaped LCMs 400A, medium capsule-shaped LCMs 400B and large capsule-shaped LCMs 400C. Regardless of the size, the capsule-shaped LCMs 100 have a cylindrical body section 410 that is symmetric about a rotational elongate axis A, as well as a pair of hemispherical end cap sections 420. In one form, at least the end cap sections 420 define a generally smooth outer surface, while in another form, the cylindrical body section 410 may form a generally smooth outer surface as well.

In one form, the small capsule-shaped LCMs 400A may have an overall length of between 2 and 3 centimeters, with an overall diameter of 1.5 centimeters. In addition, a cylindrical body section 410 may define a length along its axial dimension of 1.75 centimeters such that the axial length associated with the two opposed end caps is 0.5 centimeters. The small capsule-shaped LCM 400A also has an aspect ratio of 1.5. Although three different sizes of capsule-shaped LCMs 400A, 400B and 400C are depicted in the present disclosure, it will be appreciated that other sizes with different lengths, diameters and aspect ratios can be engineered to meet any operational demand, and that all such variants are within the scope of the present disclosure.

Significantly, the orientation of the fractures within a loss zone is not important, as the capsule-shaped LCMs 400 will work with both vertical and horizontal fractures. Due to the resilient characteristics of rubber particles 120 bounded together by the polymer adhesive 130, coupled with the varying sizes and non-axisymmetric profile of the resulting capsule-shaped LCMs 400, they can shrink under pressure to enter into cylindrical or pseudo-cylindrical fractures with an opening or gap size smaller, equal to or greater than the capsule-shaped LCM dimensions in order to create a tight seal at the bulged narrow zones of the fractures.

To form the LCMs, rubber particles (also referred to as "crumb rubber") 120 are dispersed throughout a polymer precursor fluid that, when cured, acts as an adhesive-like binder. The rubber particles 120 may be created through suitable rubber recycling activities, such as the recapping or shredding of discarded automotive tires the latter of which may first involve the removal of other tire components such as steel, reinforcing fibers or the like prior to grinding or related particle-producing operations. Examples of rubber that can be used in granulated or shredded form include natural or synthetic rubbers, such as styrene-butadiene rubber (SBR), ethylene propylene diene monomer (EPDM) rubber or their variations. In one form, such rubber may be vulcanized or otherwise cured.

The polymer adhesive 130 may be polyurethane. Examples of polyurethane-based materials that may be used as the binder include latex or oil modified polyurethane. In one form, the polyurethane that is used as a binding agent for the particulate rubber is a reaction product of an aromatic polyisocyanate-prepolymer moisture-curing binder based on diphenylmethane diisocyanate, a commercial example of which may include PU Binder 1118 from KDF of Thessaloniki, Greece. PU Binder 1118 is a 100% solids, moisture curing polyurethane prepolymer. It is MDI based and solvent free with an expected curing time of between 4 and 6 hours in average atmospheric temperatures. PU Binder 1118 has a viscosity of between 3000 and 5000 mPa·s at 25° C., and has an NCO content of between 8% and 9.5%. In one form, the mixture of the rubber granules and binder is air-cured. Other polyurethanes may be used so long as strength of the bonds is sufficient to form the resulting LCMs. In one particular form, the polyurethane is solvent-free.

Figure 5:
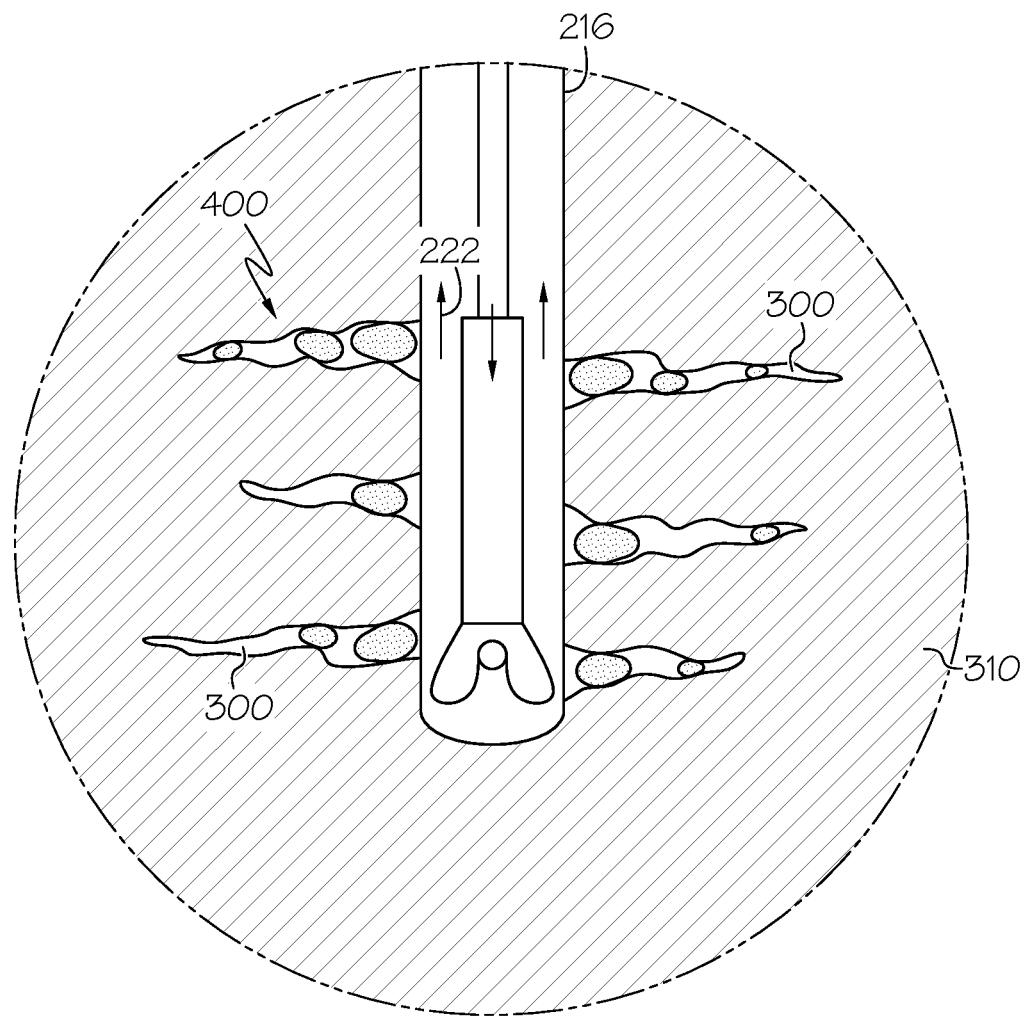
FIG. 5 illustrates a wellbore drilled in a fractured formation and the capsule-shaped LCMs that penetrated the fractures and sealed the zone.

Referring next to FIG. 5, a simplified cutaway view of the use of capsule-shaped LCMs 400 that are situated within fractures 300 that are formed in a severe loss zone 310 of wellbore 216 is shown. As depicted, the loss zones 310 contain nearly equal dimension fractures 300, although it will be appreciated that certain bulges, ledges and footholds may be present at some locations within the length of the fractures 300. The drilling fluid 222 may be introduced into the severe loss zone 310 such that the capsule-shaped LCMs 400 become lodged in the fractures 300; such lodging forms flow blockage that helps to isolate the severe loss zone 310 of the wellbore 216. To isolate the severe loss zone 310, the capsule-shaped LCMs 400 are introduced into the severe loss zone 310 as squeezing pressure is applied down the wellbore 216. This squeezing pressure causes the hemispherical ends of the capsule-shaped LCMs 400 to slide into the openings caused by fractures 300, which in turn produces a friction-based wedging of the capsule-shaped LCMs 400 that in turn seals off the severe loss zone 310 from any additional fluid flow.

The external surface area of the capsule-shaped LCMs 400 can adjust under the pressure with a change in their shape and size while still maintaining a close contact with the internal surface of the fractures 300 of the loss zones 310. Significantly, after the cessation of pumping, the resilient character of the capsule-shaped LCMs 400 allows them to remain in place in order to maintain the tight fit condition and prevent the loss of the drilling fluid 222. As previously discussed, at least one of the cylindrical body section 410 and the end caps 420 have a smooth outer surface; such construction promotes reduced friction between the capsule-shaped LCMs 400 and the fracture loss zones 310 at least during such time as the capsule-shaped LCMs 400 are being introduced to the fractures 300 along with the drilling fluid 222 to enhance the ability of the capsule-shaped LCMs 400 to seal and plug the fluid escaping channels at the narrow or restricted zone of the flow path and thus prevent or reduce the loss of whole mud from the wellbore 216 into a neighboring formation.

Figure 6:
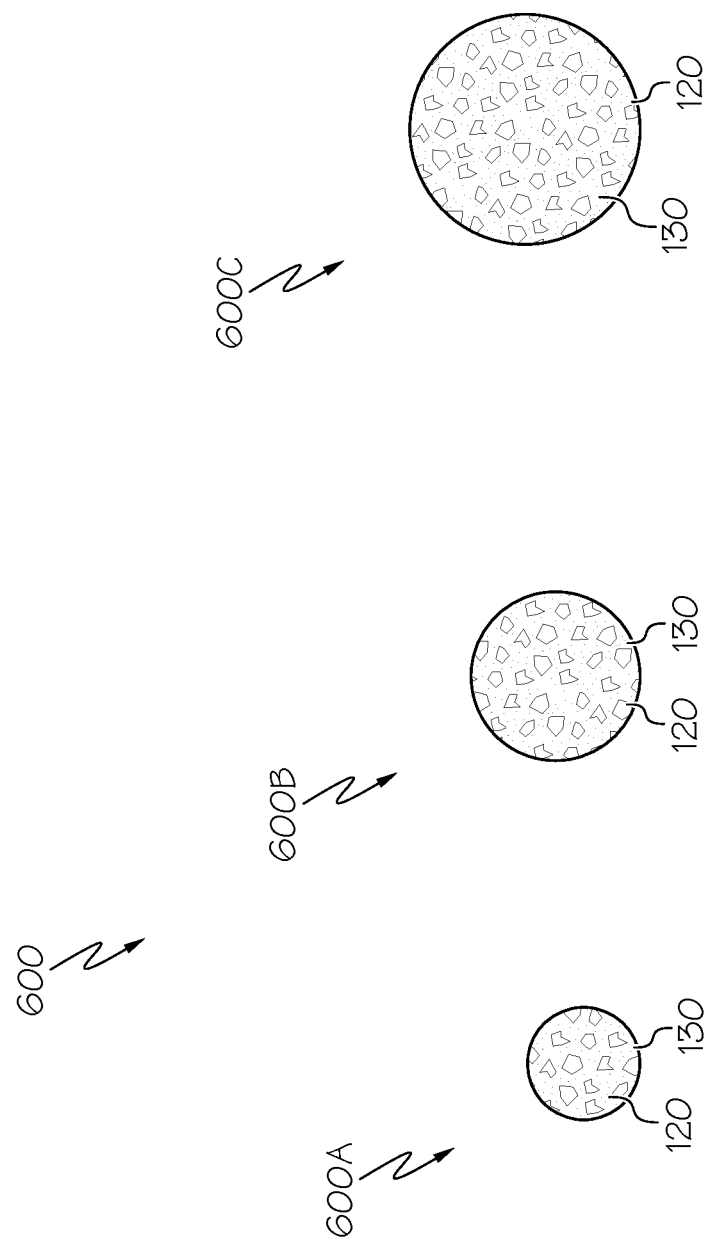
FIG. 6 depicts three different sizes of spherical-shaped LCMs in accordance with one or more embodiments shown or described.

Referring to FIG. 6, details associated with various sizes of spherical-shaped LCMs that are generally identified as 600 are shown, where more particularly the sizes may correspond to small spherical-shaped LCMs 600A, medium spherical-shaped LCMs 600B and large spherical-shaped LCMs 600C. Regardless of the size, the spherical-shaped LCMs 600 have a spherical body section that in one form may possess a generally smooth outer surface.

In one form, the small spherical-shaped LCMs 600A may have an overall diameter of about 2 centimeters, while the medium spherical-shaped LCMs 600B may have an overall diameter of about 4 centimeters and the large spherical-shaped LCMs 600C may have an overall diameter of about 6 centimeters. Although three different sizes of spherical-shaped LCMs 600A, 600B and 600C are depicted in the present disclosure, it will be appreciated that other sizes with different diameters can be engineered to meet any operational demand, and that all such variants are within the scope of the present disclosure.

Significantly, the orientation of the fractures within a loss zone is not important, as the spherical-shaped LCMs 600 will work with both vertical and horizontal fractures. Due to the resilient characteristics of rubber particles 120 bounded together by the polymer adhesive 130, coupled with the varying sizes and non-axisymmetric profile of the resulting spherical-shaped LCMs 600, they can easily enter into spherical or pseudo-spherical fractures with an opening or gap size smaller, equal to or greater than the spherical-shaped LCM dimensions in order to create a tight seal at the bulged narrow zones of the fractures. Due to the highly elastic characteristic of the scrap tire particles, the spherical-shaped LCMs 600 can also shrink significantly under the action of pressure in order to enter into smaller fractures and gaps so long as the amount of shrinkage is sufficient for a particular fracture size.

Figure 7:
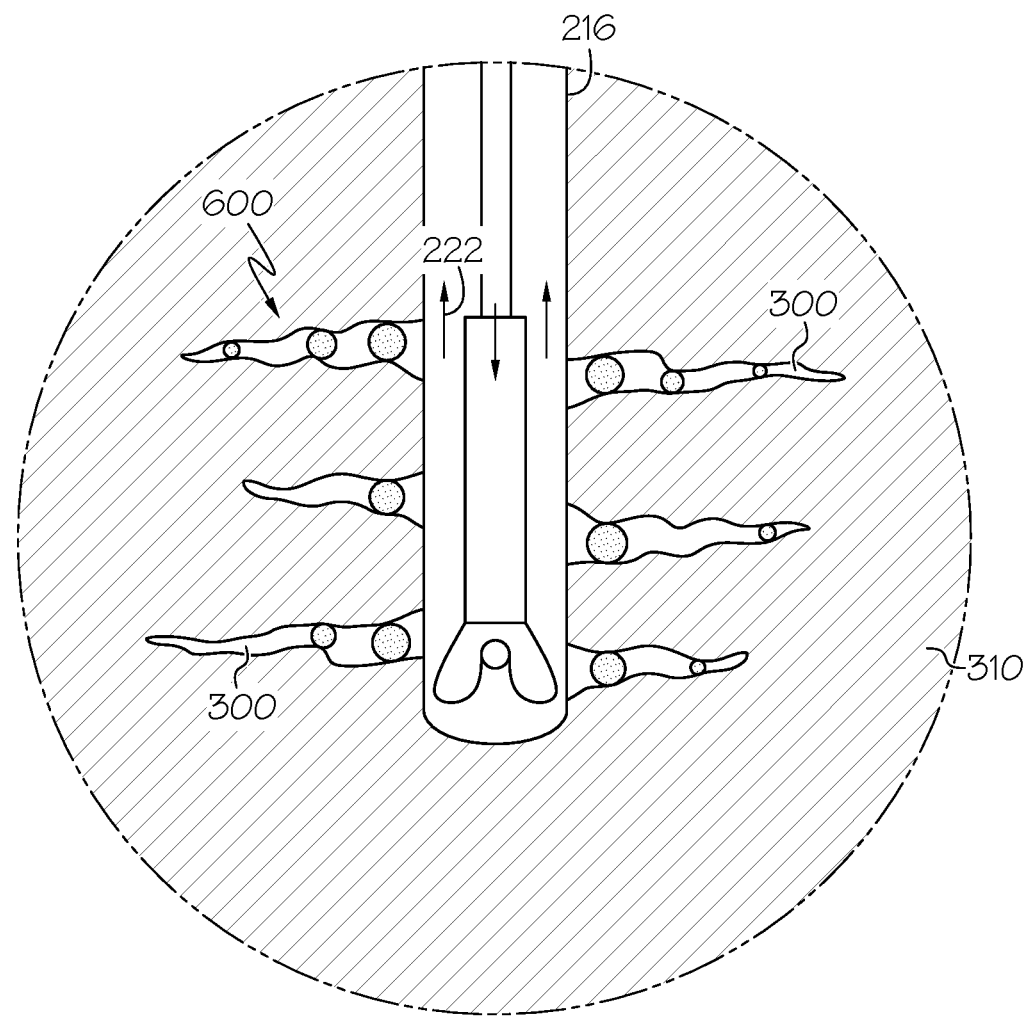
FIG. 7 illustrates a wellbore drilled in a fractured formation and the spherical-shaped LCMs that penetrated the fractures and sealed the zone.

Referring next to FIG. 7, a simplified cutaway view of the use of spherical-shaped LCMs 600 that are situated within fractures 300 that are formed in a severe loss zone 310 of wellbore 216 is shown. As depicted, the loss zones 310 contain nearly equal dimension fractures 300, although it will be appreciated that certain bulges, ledges and footholds may be present at some locations within the length of the fractures 300. The drilling fluid 222 may be introduced into the severe loss zone 310 such that the spherical-shaped LCMs 600 become lodged in the fractures 300; such lodging forms flow blockage that helps to isolate the severe loss zone 310 of the wellbore 216. To isolate the severe loss zone 310, the spherical-shaped LCMs 600 are introduced into the severe loss zone 310 as squeezing pressure is applied down the wellbore 216. This squeezing pressure causes the spherical-shaped LCMs 600 to slide into the openings caused by fractures 300, which in turn produces a friction-based wedging of the spherical-shaped LCM 600 that in turn seals off the severe loss zone 310 from any additional fluid flow.

The external surface area of the spherical-shaped LCMs 600 can adjust under the pressure with a change in their shape and size while still maintaining a close contact with the internal surface of the fractures 300 of the loss zones 310. Significantly, after the cessation of pumping, the resilient character of the spherical-shaped LCMs 600 allows them to remain in place in order to maintain the tight fit condition and prevent the loss of the drilling fluid 222. As previously discussed, in one form, the body of the spherical-shaped LCMs 600 has a smooth outer surface; such construction promotes reduced friction between the spherical-shaped LCMs 600 and the fracture loss zones 310 at least during such time as the spherical-shaped LCMs 600 are being introduced to the fractures 300 along with the drilling fluid 222 to enhance the ability of the spherical-shaped LCMs 600 to seal and plug the fluid escaping channels at the narrow or restricted zone of the flow path and thus prevent or reduce the loss of whole mud from the wellbore 216 into a neighboring formation.

Figure 8:
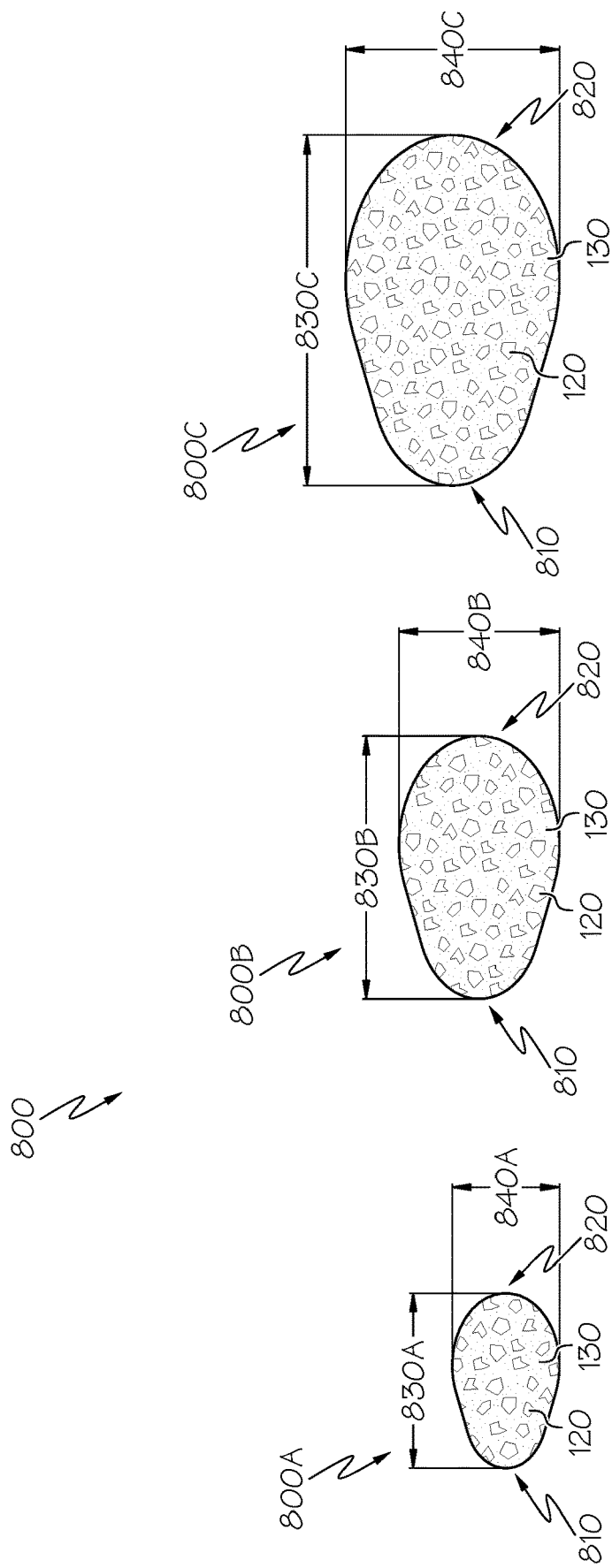
FIG. 8 depicts three ovoid-shaped LCMs of varying dimensions, in which the ovoid-shaped LCMs comprise granular scrap tire particles mixed with a polymer adhesive.

Referring to FIG. 8, an LCM additive for a wellbore drilling fluid is shown. The additive includes a plurality of ovoid-shaped LCMs 800 of various sizes, each with a narrow tip 810 and a broad base 820. In one form, the ovoid-shaped LCMs 800 comprise a plurality of granular scrap tire particles 120 and a polymer adhesive 130 that is dispersed between the plurality of granular scrap tire particles 120 and binds the plurality of granular scrap tire particles 120 together. The resulting ovoid-shaped LCMs 100 form a resilient elastic rubber sealant material that is malleable, ductile, deforms without failure, and shrinks under pressure to enter fractures. The granular scrap tire particles 120 mix with the polymer adhesive 130 such that the polymer adhesive 130 is dispersed between the granular scrap tire particles 120, binding the granular scrap tire particles 120 together and holding the granular scrap tire particles 120 in place throughout the ovoid-shaped LCMs 800.

FIG. 8 shows three different sizes of the ovoid-shaped LCMs 800 where one ovoid-shaped LCM 800A comprises a major axis length 830A of 2.125 centimeters (cm), a minor axis length 840A of 1.5 cm, and a surface area of at least 9 cm$^2$. In a second embodiment, the ovoid-shaped LCM 800B comprises a major axis length 830B of 4.25 cm, a minor axis length 840B of 3 cm, and a surface area of at least 36 cm$^2$. In a third embodiment, the ovoid-shaped LCM 800C comprises a major axis length 830C of 8.5 cm, a minor axis length 840C of 6 cm, and a surface area of at least 104 cm$^2$. In another embodiment, the ovoid-shaped LCMs 800 may comprise a major axis length ranging from 2.125 to 8.5 centimeters, a minor axis length ranging from 1.5 to 6 centimeters, and an ovoid surface area of at least 9 square centimeters. The ovoid-shaped LCMs 800 may be formed in a variety of sizes in further embodiments, not limited to the sizes described in this disclosure.

Figure 9:
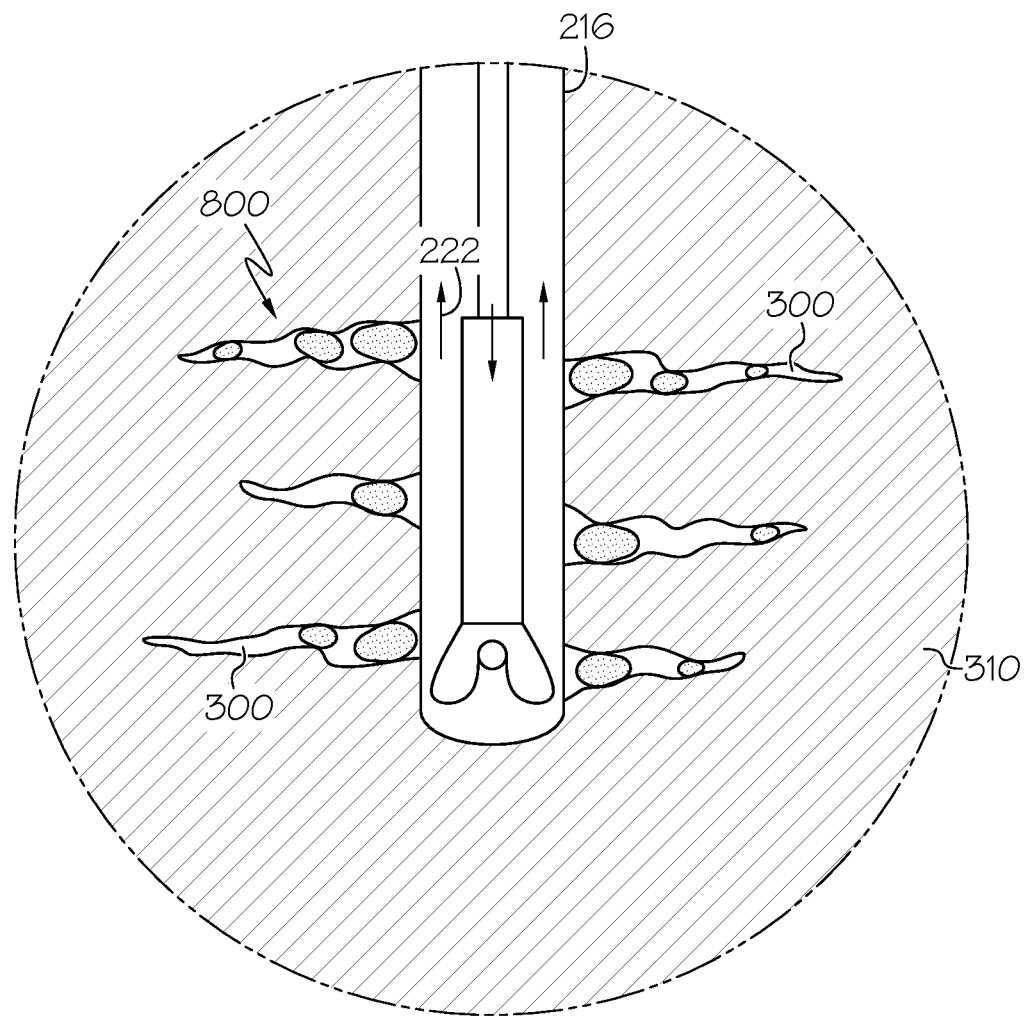
FIG. 9 illustrates a wellbore drilled in a fractured formation and the ovoid-shaped LCMs that penetrated the fractures and sealed the zone.

Referring next to FIG. 9, the drilling fluid 222 may be introduced into the severe loss zone 310 such that the ovoid-shaped LCMs 800 become lodged in the fractures 300 that define the severe loss zone 310; such lodging forms flow blockage that helps to isolate the severe loss zone 310 of the wellbore 226. More specifically, the ovoid-shaped LCMs 800 may be used for a severe loss zone 310 comprised of ovoid-shaped fracture openings 300. To isolate the severe loss zone 310, the ovoid-shaped LCM 800 is introduced into the severe loss zone 310 as squeezing pressure is applied down the wellbore 216. This squeezing pressure causes the narrow tip 810 of the ovoid-shaped LCM 800 to slide into the ovoid-shaped fracture openings 300, wedging the ovoid-shaped LCM 800 into the ovoid-shaped fracture openings 300 and sealing the severe loss zone 310.

In one embodiment, the plurality of ovoid-shaped LCMs 800 have a major axis length ranging from 2.5 to 7.5 centimeters, a minor axis length ranging from 5 to 10 centimeters, and an ovoid surface area of at least 19 square centimeters, and can create a tight seal in ovoid-shaped fracture openings 300 with an opening major axis length or gap size smaller than, equal to, or greater than 2.5 centimeters. In another embodiment, the method further comprises drilling through plurality of ovoid-shaped LCMs 800 sealing the severe loss zone 310 to continue drilling the wellbore 216. In another embodiment, the method further comprises introducing the plurality of ovoid-shaped LCMs 800 to the severe loss zone 310 through a drill string disposed within the wellbore 216. In another embodiment, the method further comprises introducing a displacement fluid to displace the plurality of ovoid-shaped LCMs 800 into severe loss zone 310.

This disclosure also recites a drilling fluid comprising a slurry made of a weighting material and a liquid carrier, and the LCM additive. The liquid carrier may comprise an aqueous-based liquid, or, alternatively, an oil-based liquid.

EXAMPLE

The following examples illustrate features of the present disclosure but are not intended to limit the scope of the disclosure.

Example 1

To demonstrate the improved stability, sample cone-shaped LCMs were submerged in a water solution and a mineral oil solution for 72 hours and evaluated every 24 hours.

TABLE 1

| Time | Water Solution | Mineral Oil Solution |
|---|---|---|
| 24 Hours | No disintegration | No disintegration |
| 48 Hours | No disintegration | No disintegration |
| 72 Hours | No disintegration | No disintegration |

In these tests, the LCMs held their shape, showed dimensional stability whether immersed in water or mineral oil solutions. Specifically, there was minimal to no degradation, disintegration, or dispersion of the granular scrap tire particles held together by the polyurethane binder during the 72 hour testing. Here, this means that the overall dimensions of the cone-shaped LCMs samples were not reduced by more than 5%; the dimensions of the cone-shaped LCMs samples were essentially the same before and after testing.

Example 2

To quantify the resiliency of the LCMs, a LCM sample was placed in a metallic cell and an axial force of 10,000 pounds per square inch (psi) was applied to the LCM sample. The LCM sample included 20 wt. % PU Binder 1118, available from KDF, calculated by weight of the LCM sample. The rubber used in the LCM sample was black SBR rubber granules available from SARPCO. The density of the LCM sample was 0.8 grams per cubic centimeter (g/cc). The resiliency was determined using the following equation:

$$\text{Resiliency (\%)} = 100\left(\left(\frac{h_r}{h_0}\right) - 1\right)$$

The initial length of the LCM sample was measured before the resiliency testing. The axial force of 10,000 psi was then applied to the sample, and the compressed length of the sample, $h_0$, and the unconfined compressive strength (UCS) of the LCM sample was measured. The sample was then allowed to expand after the axial force was released and an uncompressed sample length, $h_r$, was measured. The results of the resiliency test are shown in Table 1:

TABLE 1

Resiliency Test Results

| Initial length (mm) | $h_o$ (mm) | $h_r$ (mm) | Deformation Percentage (%) | Resiliency Percentage (%) | UCS (Psi) |
|---|---|---|---|---|---|
| 65.78 | 33.15 | 64.26 | 49.62 | 93.88 | 541.25 |

As shown in Table 1, the resiliency of the LCM sample was measured to be 93.88%. This means that the LCM sample is very resilient and capable of being compressed and wedged into fractures, and then expanding within the fracture, thereby sealing the fracture.

A first aspect of the present disclosure may be directed to a loss material additive for a wellbore drilling fluid, the additive comprising a plurality of spherical-shaped LCMs that define a plurality of different sizes and that are non-reactive with a drilling fluid, the additive comprising an elastically-deformable mixture comprising: a plurality of rubber particles; and a polymer that binds the plurality of rubber particles together.

A second aspect of the present disclosure may include the first aspect, in which the spherical-shaped LCMs include a first size with an overall diameter of at least about 2 centimeters, a second size with an overall diameter of about at least about 4 centimeters and a third size with an overall diameter of at least about 6 centimeters.

A third aspect of the present disclosure may include the first and second aspects, in which the polymer comprises a polyurethane-based material.

A fourth aspect of the present disclosure may include any of the first through third aspects, in which the polymer comprises a reaction product of an aromatic polyisocyanate-prepolymer based on diphenylmethane diisocyanate.

A fifth aspect of the present disclosure may include any of the first through fourth aspects, in which the rubber particles comprise at least one of styrene-butadiene rubber and ethylene propylene diene monomer rubber.

A sixth aspect of the present disclosure may include any of the first through fifth aspects, in which the rubber particles define a maximum linear dimension of between 0.5 millimeters and 2 millimeters.

A seventh aspect of the present disclosure may include any of the first through sixth aspects, in which the elastically-deformable mixture comprises between about 20% and 30% by volume of the polyurethane-based material.

An eighth aspect of the present disclosure may include any of the first through seventh aspects, in which the elastically-deformable mixture has a cure time of no more than 24 hours.

A ninth aspect of the present disclosure may be directed to a drilling fluid comprising: a slurry comprising a clay-based material and a liquid carrier; and a loss control material additive comprising a plurality of spherical-shaped LCMs that define a plurality of different sizes and that are non-reactive with the slurry, the loss control material additive comprising an elastically-deformable mixture comprising: a plurality of rubber particles; and a polymer that binds the plurality of rubber particles together.

A tenth aspect of the present disclosure may include the ninth aspect, in which the drilling fluid is made from a water-based liquid.

An eleventh aspect of the present disclosure may include the ninth and tenth aspects, in which the drilling fluid is made from a petroleum-based liquid.

A twelfth aspect of the present disclosure may include any of the ninth through eleventh aspects, in which various mixture ratios between the slurry and the additive may be used.

A thirteenth aspect of the present disclosure may be directed to a method of reducing lost circulation in a severe loss zone of a wellbore. The method comprises combining a liquid carrier with a clay-based material and a loss control material additive. The loss control material additive comprises a plurality of spherical-shaped LCMs and an elastically-deformable mixture. The plurality of spherical-shaped LCMs define a plurality of different sizes and that are non-reactive with the liquid carrier. The elastically-deformable mixture comprises a plurality of rubber particles and a polymer that binds the plurality of rubber particles together. The method further comprises introducing the drilling fluid and loss control material additive into the severe loss zone such that the plurality of spherical-shaped LCMs form a resilient sealant that becomes lodged in at least one fracture that defines the severe loss zone.

A fourteenth aspect of the present disclosure may include the thirteenth aspect, in which the drilling fluid and additive are introduced into the wellbore through a drill string.

A fifteenth aspect of the present disclosure may be directed to a method of making a loss control material additive. The method comprises combining a plurality of rubber particles with a polymer precursor fluid into a mixture, placing the mixture into a plurality of spherical-shaped molds of different sizes that correspond to a severe loss fracture zone, and curing the placed mixture. Curing the placed mixture forms a polymer matrix surrounding the plurality of rubber particles. The resulting spherical-shaped LCMs are defined by material properties that make them both elastically deformable and non-reactive with a drilling fluid that is introduced into the severe loss fracture zone.

A sixteenth aspect of the present disclosure may include the fifteenth aspect, in which the rubber particles are made up of shredded vehicular tires that have had at least one of dust, steel fibers and textile fibers removed from the tires prior to being shredded.

A seventeenth aspect of the present disclosure may include the fifteenth and sixteenth aspects, in which the mixture is compressed while in the cylindrical-shaped molds such that a minimum density of the spherical-shaped LCMs is attained.

Having described the subject matter of the present disclosure in detail and by reference to specific embodiments of these, it is noted that the various details disclosed in this disclosure should not be taken to imply that these details relate to elements that are essential components of the various embodiments described in this disclosure, even in cases where a particular element is illustrated in each of the drawings that accompany the present description. Further, it will be apparent that modifications and variations are possible without departing from the scope of the present disclosure, including, but not limited to, embodiments defined in the appended claims.

It is noted that one or more of the following claims utilize the term "in which" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A plurality of lost circulation material additives for a drilling fluid, the additives comprising spherical-shaped Lost Circulation Materials (LCMs) comprising:
   a plurality of granular scrap tire particles; and
   a polymer adhesive that is dispersed between the plurality of granular scrap tire particles and binds the plurality of granular scrap tire particles together,
   such that the LCMs are compressed and wedged into fractures with openings in a subsurface loss zone, in which the openings are spherical-shaped, and in which the spherical-shaped LCMs and the openings have:
      a diameter of about 2 centimeters to about 6 centimeters.

2. The additives of claim 1, in which the polymer adhesive comprises a reaction product of an aromatic polyisocyanate-prepolymer based on diphenylmethane diisocyanate.

3. The additives of claim 1, in which the plurality of granular scrap tire particles comprises at least one of styrene-butadiene rubber and ethylene propylene diene monomer rubber.

4. The additives of claim 1, in which each of the additives comprises from 20 to 30 vol. % of the polymer adhesive.

5. The additives of claim 1, in which the polymer adhesive comprises a polyurethane-based material.

6. The additives of claim 1, in which the plurality of granular scrap tire particles defines a maximum linear dimension of between 500 microns to 10,000 microns each.

7. The additives of claim 1, in which:
   the polymer adhesive comprises a reaction product of an aromatic polyisocyanate-prepolymer based on diphenylmethane diisocyanate;
   the plurality of granular scrap tire particles comprises at least one of styrene-butadiene rubber and ethylene propylene diene monomer rubber; and
   each of the additives comprises from 20 to 30 vol. % of the polymer adhesive.

8. A fluid comprising:
   a slurry comprising a liquid carrier;
   a weighting agent; and
   a plurality of lost circulation material additives, the additives comprising spherical-shaped Lost Circulation Materials (LCMs) comprising:
      a plurality of granular scrap tire particles; and
      a polymer adhesive that is dispersed between the plurality of granular scrap tire particles and binds the plurality of granular scrap tire particles together,
      such that the LCMs are compressed and wedged into fractures with openings in a subsurface loss zone, in which the openings are spherical-shaped, and in which the spherical-shaped LCMs and the openings have:
         a diameter of about 2 centimeters to about 6 centimeters.

9. The fluid of claim 8, in which:
   the polymer adhesive comprises a reaction product of an aromatic polyisocyanate-prepolymer based on diphenylmethane diisocyanate;
   the plurality of granular scrap tire particles comprises at least one of styrene-butadiene rubber and ethylene propylene diene monomer rubber; and
   each of the additives comprises from 20 to 30 vol. % of the polymer adhesive.

10. The fluid of claim 8, in which the polymer adhesive comprises a polyurethane-based material.

11. The fluid of claim 8, in which the polymer adhesive comprises a reaction product of an aromatic polyisocyanate-prepolymer based on diphenylmethane diisocyanate.

12. The fluid of claim 8, in which the plurality of granular scrap tire particles comprises at least one of styrene-butadiene rubber and ethylene propylene diene monomer rubber.

13. The fluid of claim 8, in which the plurality of granular scrap tire particles defines a maximum linear dimension of between 500 microns to 10,000 microns each.

* * * * *